(12) United States Patent
Shiraiwa et al.

(10) Patent No.: US 6,552,159 B1
(45) Date of Patent: *Apr. 22, 2003

(54) CLADDING RESIN COMPOSITION

(75) Inventors: Tetsuo Shiraiwa, Nara (JP); Shigeo Mori, Kyoto (JP)

(73) Assignee: Dao-Ichi Kogyo Seiyaku Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,068

(22) Filed: Mar. 3, 1997

Related U.S. Application Data

(63) Continuation of application No. 08/434,305, filed on May 2, 1995, now abandoned, which is a continuation of application No. 07/831,139, filed on Feb. 4, 1992, now abandoned.

(30) Foreign Application Priority Data

Mar. 15, 1991 (JP) .............................................. 3-076892

(51) Int. Cl.$^7$ ............................................ C08G 63/692
(52) U.S. Cl. ........................... 528/287; 528/45; 528/80; 528/84; 528/271; 528/272; 528/297; 528/392; 528/397
(58) Field of Search ............................. 528/45, 51, 59, 528/72, 80, 84, 272, 287, 271, 297, 397, 392

(56) References Cited

U.S. PATENT DOCUMENTS

| | | | | | |
|---|---|---|---|---|---|
| 3,626,023 | A | * | 12/1971 | Brizgys | .................... 427/383.1 |
| 4,259,472 | A | * | 3/1981 | Chatta et al. | .................. 528/72 |
| 4,298,709 | A | * | 11/1981 | Ginter et al. | ............. 528/72 X |
| 4,963,639 | A | * | 10/1990 | Sato et al. | ..................... 528/72 |
| 5,162,162 | A | * | 11/1992 | Yasuda et al. | ............. 528/72 X |
| 5,292,853 | A | * | 3/1994 | Yasuda et al. | ................. 528/72 |

FOREIGN PATENT DOCUMENTS

| | | | | | |
|---|---|---|---|---|---|
| CA | 0625891 | * | 8/1961 | | .................. 528/72 |
| EP | 0408990 | * | 1/1991 | | .................. 528/72 |
| GB | 0918868 | * | 2/1963 | | .................. 528/72 |
| GB | 1108158 | * | 4/1968 | | .................. 528/72 |
| SU | 1130574 | * | 12/1984 | | .................. 528/72 |

* cited by examiner

*Primary Examiner*—Judy M. Reddick
(74) *Attorney, Agent, or Firm*—Jordan and Hamburg LLP

(57) ABSTRACT

The invention relates to a cladding resin composition curable by heat, ultraviolet radiation, an electron beam or the like. The composition comprises a polyoxyalkylene polyol phosphate ester (hydroxyl value: 10–2,000 mg KOH/g) and a polymerizable or reactive functional group-containing compound. This composition is highly conductive as it is and, without incorporation of the conventional conductive additives, can be used successfully in the field of coatings and protective films where electric conductivity is a requisite.

8 Claims, No Drawings

CLADDING RESIN COMPOSITION

This application is a continuation, of application Ser. No. 08/434,305 filed May 2, 1995, now abandoned, which is a continuation of application Ser. No. 07/831,139 filed Feb. 4, 1992, now abandoned.

BACKGROUND OF THE INVENTION

The present invention relates to a cladding resin composition which can be cured by heat, ultraviolet light or an electron beam.

In the conventional resin composition for cladding. purposes, improvement of the electric conductivity of the cured film has been sought by incorporating a conductive substance such as carbon black, and graphite or the like.

However, the practice requires a large quantity of such conductive substance and this causes problems in dispersibility and entails physical degradation of the resin.

SUMMARY OF THE INVENTION

It is an object of the present invention to overcome the above-mentioned disadvantages and provide a highly conductive cladding resin composition without involving addition of such conventional conductive substance.

The present invention is, therefore, concerned with a cladding resin composition comprising a polyoxyalkylene polyol phosphate ester (hydroxyl value: 10–2,000 mg KOH/g) and a polymerizable or reactive functional group-containing compound. Reactive functional group-containing compounds include ones that are polymerizable.

DETAILED DESCRIPTION: OF THE PREFERRED EMBODIMENTS

The polyoxyalkylene polyol to be used in accordance with the invention can be prepared, for example by addition-polymerizing an alkylene oxide and/or a glycidyl ether with an active hydrogen compound in the presence of a catalyst and removing the catalyst by a per se known purification procedure such as ion exchange, neutralization filtration, adsorption and so on. This polyoxyalkylene polyol preferably has a molecular weight of 200 to 10,000.

The active hydrogen compound mentioned above includes various compounds each having two or more active hydrogen atoms, such as polyhydric alcohols, e.g. ethylene glycol, propylene glycol, 1,4-butanediol, glycerol, trimethylolpropane, sorbitol, sucrose, etc., amine compounds, e.g. monoethanolamine, ethylenediamine, diethylenetriamine, 2-ethylhexylamine, hexamethylenediamine, etc., and phenolic active hydrogen compounds such as bisphenol A, hydroquinone and so on.

The alkylene oxide mentioned above includes, among others, ethylene oxide, propylene oxide, butylene oxide, hexene oxide, cyclohexene oxide, nonene oxide, and α-olefin oxides containing 12 to 28 carbon atoms.

The glycidyl ether mentioned above includes, among others, methyl glycidyl ether, butyl glycidyl ether, allyl glycidyl ether, phenyl glycidyl ether and so on.

In the addition-polymerization to the active hydrogen compound, either an alkylene oxide or a glycidyl ether or both may be reacted and, in the latter (copolymerization) case, the order of addition is optional. As the catalyst for this addition-polymerization reaction, a basic catalyst such as sodium methoxide, sodium hydroxide, potassium hydroxide, lithium carbonate, etc. is generally employed but a Lewis acid catalyst such as boron trifluoride or an amine catalyst such as trimethylamine, triethylamine, etc. is also useful. The amount of such catalyst can be the amount generally employed.

The polyoxyalkylene polyol may be partially substituted by a halogen, such as chlorine and/or bromine.

For phosphorylation of such polyoxyalkylene polyol, a phosphorus compound such as diphosphorus pentoxide, phosphoryl trichloride or the like is employed.

The phosphorylation reaction is conducted in the routine manner and the proportions of the polyoxyalkylene polyol and phosphorus compound are such that the product phosphate ester will have a hydroxyl value in the range of 10 to 2,000 mg KOH/g. This phosphate ester may be partially converted to a metal salt, such as an alkali metal salt, e.g. lithium salt, sodium salt or potassium salt. Such a metal salt can be prepared by neutralizing the phosphate ester with an basic alkali metal compound such as lithium hydroxide, sodium hydroxide or potassium hydroxide.

The polymerizable or reactive functional group-containing compound includes, among others, various polyisocyanates, unsaturated compounds such as active hydrogen-containing (meth)acrylates, (meth)acrylic acid, maleic anhydride, etc., glycidyl ether compounds and so on, and these compounds can be used alone or in combination.

Throughout this specification, (meth)acrylic acid means acrylic acid and/or methacrylic acid, while (meth)acrylate represents acrylate and methacrylate.

The polyisocyanate compound includes, among others, 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate etc. as well as mixtures thereof. Polyisocyanates having polyoxyalkylene chains can also be employed.

The polyisocyanate compounds may be used in the form of blocked isocyanates. The blocking agent which can be used for this purpose includes methyl ethyl ketoxime, phenol, caprolactam, ethyl acetoacetate, methanol, sodium hydrosulfite and so on. The blocking can be achieved by adding such a blocking agent to a polyisocyanate and reacting the mixture at 30–90° C. for 0.5 to 2 hours.

The active hydrogen-containing (meth)acrylate includes, among others, dihydric alcohol mono(meth)acrylates such as ethylene glycol mono(meth)acrylate, propylene glycol mono(meth)acrylate, diethylene glycol mono(meth)acrylate and so on.

The glycidyl ether compound includes, among others, ethylene glycol diglycidyl ether, polypropylene glycol diglycidyl ether, polyethylene glycol diglycidyl ether, trimethylolpropane diglycidyl ether and sorbitol polyglycidyl ether.

The polyoxyalkylene polyol phosphate ester and the polymerizable or reactive functional group-containing compounds react with each other to give a cured product. When two or more different polymerizable or reactive functional group-containing compounds are employed, all of them may be reacted concurrently or one or more of them be reacted in the first place, with the remainder being reacted thereafter. The proportion of the polymerizable or reactive functional group-containing compound is 1.0 to 10.0 moles per mole of the phosphate ester.

The catalyst for this reaction is selected according to the kind of polymerizable or reactive functional group-containing compound. In the case of polyisocyanates, there may be employed organometal catalysts such as dibutyltin dilaurate, dibutyltin diacetate, phenyl-mercury propionate, lead octenoate, etc. and amine catalysts such as triethylenediamine, N,N'-dimethyl-piperazine, N-methylmorpholine, tetramethylguanidine, triethylamine, etc. In the case of (meth)acrylic acid, sulfuric acid and p-toluenesulfonic acid may be employed and, where necessary, polymerization inhibitors such as hydroquinone, hydroquinone monomethyl ether, etc. can be employed in conjunction.

In the cladding resin composition of the invention, said phosphate ester and polymerizable or reactive functional group-containing compound react with each other to give a cured resin. This reaction can be induced by heat, ultraviolet light, an electron beam or the like and, where necessary, a polymerization initiator and a sensitizer may also be used.

Since the cladding resin composition of the invention is highly conductive, it is no longer necessary to incorporate the conventional conductive substance and the composition can be used advantageously in the field of coatings and protective films, etc. where electric conductivity is a requisite.

The following examples and comparative examples are further illustrative and by no means limitative of the invention.

EXAMPLE 1

A 5 l autoclave was charged with 920 g of glycerol and 12 g of potassium hydroxide. Then, 2,500 g of propylene oxide and 700 g of ethylene oxide were successively introduced and reacted at 120° C. for 6 hours. The reaction was further continued at the same temperature for 3 hours. The reaction product was then purified to give 3,900 g of a polyoxyalkylene polyol (A-1) having a molecular weight (calculated from the OH value) of 400.

To 200 g of the above polyoxyalkylene polyol (A-1) was added 24 g of diphosphorus pentoxide and the reaction was carried out at 70° C. with stirring for 3 hours to give a phosphate ester (B-1) (OH value: 310 mg KOH/g, viscosity: 480 cps/25° C.).

To 100 g of the above phosphate ester (B-1) were added 48 g of 2,4-tolylene diisocyanate, 0.05 g of dibutyltin dilaurate and 50 g of methyl ethyl ketone to provide a cladding resin composition. This composition was coated on an aluminum sheet (JIS K5400; 50 mm×50 mm×1 mm; the same applies hereafter) and caused to dry and cure at 150° C. for 30 minutes to give a test sample (S-1) having a coating thickness of 20 μm.

EXAMPLE 2

A 5 l autoclave was charged with 920 g of glycerol and 4 g of potassium hydroxide. Then, 1,200 g of ethylene oxide was introduced at 130° C. for 3 hours. The reaction was further continued at the same temperature for 1 hour. The reaction product was then purified to give 1,900 g of a polyoxyalkylene polyol (A-2) having a molecular weight (calculated from the OH value) of 200.

To 200 g of this polyoxyalkylene polyol (A-2) was added 34 g of diphosphorus pentoxide and the reaction was conducted at 70° C. with stirring for 3 hours to give a phosphate ester (B-2) (OH value: 780 mg KOH/g, viscosity: 360 cps/25° C.) To 100 g of a polyethylene glycol having a molecular weight of 400 was added 84 g of hexamethylene diisocyanate and the mixture was reacted at 90° C. with stirring for 4 hours. Then, 44 g of methyl ethyl ketoxime was added and the reaction was conducted at 60° C. for 310 minutes to give a blocked isocyanate.

To 100 g of the phosphate ester (B-2) prepared above were added 512 g of this blocked isocyanate, 0.2 g of dibutyltin dilaurate and 300 g of methyl ethyl ketone to prepare a cladding resin composition. This composition was coated on an aluminum sheet and caused to dry and cure at 150° C. for 30 minutes to give a test sample (S-2) having a coating thickness of 20 μm.

EXAMPLE 3

A 5 l autoclave was charged with 390 g of tri-methylolpropane and 5 g of potassium hydroxide, and 2,100 g of ethylene oxide was introduced at 130° C. for 4 hours. The reaction was further continued at the same temperature for 1 hour. The reaction product was then purified to give 2,100 g: of a polyoxyalkylene polyol (A-3) having a molecular:weight (calculated from the OH value) of 800.

To 200 g of this polyoxyalkylene polyol (A-3) was added 10 g of pyridine, followed by addition of 6 g of phosphoryl trichloride with stirring. The reaction was carried out at 70° C. for 3 hours. After purification, 10 g of 10% aqueous solution of lithium hydroxide was added. Dehydration gave a phosphate ester (B-3) (hydroxyl value: 150 mg KOH/g, viscosity: 590 cps/25° C.). This phosphate ester had been partially converted to the lithium salt.

To 100 g of the above phosphate ester (B-3) were added 22 g of hexamethylene diisocyanate and 50 g of methyl ethyl ketone to give a cladding resin composition. This composition was coated on an aluminum sheet and caused to dry and cure at 150° C. for 30 minutes to give a test sample (S-3) having a coating thickness of 20 μm.

EXAMPLE 4

A 5 l autoclave was charged with 100 g of bis-phenol A and 6 g of potassium hydroxide, and 1,500 g of ethylene oxide was introduced at 130° C. for 3 hours. The reaction was further continued for 1 hour and the reaction product was purified to give 2,300 g of a polyoxyalkylene polyol (A-4) having a molecular weight (calculated from the OH value) of 500.

To 200 g of this polyoxyalkylene polyol (A-4) was added 10 g of diphosphorus pentoxide and the reaction was conducted at 70° C. with stirring for 3 hours to give a phosphate ester (B-4) (hydroxyl value: 140 mg KOH/g, viscosity: 530 cps/25° C.).

To 100 g of the above phosphate ester (B-4) was added 43 g of 2,4-tolylene diisocyanate and the mixture was reacted at 90° C. with stirring for 3 hours. Then, 30 g of ethylene glycol monomethacrylate was added and the mixture was further stirred under heating for 3 hours. Then, 5.2 g of a photopolymerization initiator (IRGACURE 184) was added to give a cladding resin composition. This composition was coated on an aluminum sheet and irradiated with ultraviolet light (lamp: 80 W/cm×1, distance from the lamp: 8 cm) to provide a test sample (S-4) having a coating thickness of 20 μm.

EXAMPLE 5

A 5 l autoclave was charged with 136 g of penta-erythritol and 10 g of potassium hydroxide. Then, 2,000 g of 1,2-butylene oxide and 500 g of methyl glycidyl ether were successively introduced at 110° C. over 5 hours. The reaction was further continued at the same temperature for 3 hours. The reaction product was then purified to give 2,300 g of a polyoxyalkylene polyol (A-5) having a molecular weight (calculated from the OH value) of 2,500.

To 200 g of this polyoxyalkylene polyol (A-5) was added 6 g of diphosphorus pentoxide and the mixture was reacted at 70° C. with stirring for 3 hours to give a phosphate ester (B-5) (hydroxyl value: 65 mg KOH/g, viscosity: 620 cps/25° C.).

To 100 g of the above phosphate ester (B-5) were added 20 g of acrylic acid, 50 g of benzene and 1 g of sulfuric acid and the reaction was conducted at 80–90° C. with air bubbled through the system. The end point of the reaction was confirmed from the volume of water withdrawn and the acid value. The reaction mixture was then neutralized with aqueous sodium hydroxide solution and washed with a saturated aqueous solution of sodium sulfate. After the benzene was distilled off under reduced pressure, 1 g of 2,2'-azobisisobutyronitrile (polymerization initiator) was added to give a cladding resin composition. This composition was coated on an aluminum sheet and caused to cure at 120° C. for 3 hours to provide a test sample (S-5) having a coating thickness of 20 μm.

EXAMPLE 6

A 5 l autoclave was charged with 45 g of glycerol and 16 g of potassium hydroxide, and 3,000 g of 1,2-butylene oxide and 1,500 g of ethylene oxide were successively introduced at 120° C. for 8 hours. The reaction was further continued at the same temperature for 3 hours. The reaction product was then purified to give 4,100 g of a polyoxyalkylene polyol (A-6) having a molecular weight (calculated from the OH value) of 8,000.

To 200 g of this polyoxyalkylene polyol (A-6) was added 4 g of diphosphorus pentoxide and the mixture was reacted at 70° C. with stirring for 3 hours to give a phosphate ester (B-6) (hydroxyl value: 18 mg KOH/g, viscosity: 920 cps/25° C.).

To 100 g of the above phosphate ester (B-6) were added 10 g of ethylene glycol diglycidyl ether and 1 g of diethylenetriamine (curing catalyst) to give a cladding resin composition. This composition was coated on an aluminum sheet and caused to cure at 120° C. for 5 hours to provide a test sample (S-6) having a coating thickness of 20 μm.

COMPARATIVE EXAMPLE 1

To 100 g of the polyoxyalkylene polyol (A-1) prepared in Example 1 were added 65 g of 2,4-tolylene diisocyanate, 0.05 g of dibutyltin dilaurate and 50 g of methyl ethyl ketone to prepare a cladding composition. This composition was coated on an aluminum sheet and caused to cure at 150° C. for 30 minutes to provide a test sample (S-7) having a coating thickness of 20 μm.

COMPARATIVE EXAMPLE 2

To 100 g of the polyoxyalkylene polyol (A-4) obtained in Example 4 was added 67 g of hexamethylene diisocyanate and the mixture was reacted at 90° C. with stirring for 3 hours. Then, 52 g of ethylene glycol monomethacrylate was added and the mixture was further stirred under heating for 3 hours. Then, 6.6 g of a photopolymerization initiator (IRGACURE 184) was added to the mixture to give a cladding composition. This composition was coated on an aluminum sheet and irradiated with ultraviolet light (lamp: 80 W/cm×1, distance from the lamp: 8 cm) to provide a test sample (S-8) having a coating thickness of 20 μm.

Measurement of Volume Resistivity

The test samples prepared in Examples 1 through 6 and Comparative Examples 1 and 2 were allowed to stand at the varying temperatures indicated in Table 1 for 3 days and the volume resistivity of each sample was measured with a volume resistivity meter (R8340/R12702A, manufactured by Advantest). The results are shown in Table 1.

TABLE 1

|  | Test sample | Volume resistivity (Ω · cm) 25° C. | 0° C. |
|---|---|---|---|
| Example | S-1 | $2.5 \times 10^{10}$ | $7.2 \times 10^{11}$ |
|  | S-2 | $3.6 \times 10^{10}$ | $8.1 \times 10^{11}$ |
|  | S-3 | $8.5 \times 10^{9}$ | $9.2 \times 10^{10}$ |
|  | S-4 | $6.1 \times 10^{10}$ | $5.9 \times 10^{11}$ |
|  | S-5 | $1.3 \times 10^{10}$ | $4.5 \times 10^{11}$ |
|  | S-6 | $5.7 \times 10^{10}$ | $7.9 \times 10^{11}$ |
| Comparative Example | S-7 | $5.2 \times 10^{13}$ | $2.1 \times 10^{14}$ |
|  | S-8 | $4.1 \times 10^{14}$ | $1.9 \times 10^{16}$ |

It will be apparent that the cladding resin composition according to the invention is very satisfactory in electric conductivity.

What is claimed is:

1. A cladding resin composition consisting of a polyoxyalkylene polyol phosphate ester the hydroxyl value of which is 10–2,000 mg KOH/g and at least one compound selected from the group consisting of polyisocyanates, active hydrogen-containing (meth)acrylates; (meth)acrylic acid and maleic anhydride.

2. A cladding resin composition according to claim 1 wherein said at least one compound and said polyoxyalkylene polyol phosphate ester are in a molar ratio of the former to the latter of 1:1 to 10:1.

3. A cladding resin composition according to claim 1, wherein said active hydrogen-containing (meth)acrylate is a dihydric alcohol mono(meth)acrylate.

4. A cladding resin composition according to claim 1, wherein said active hydrogen-containing (meth)acrylate is at least one member selected from the group consisting of ethylene glycol mono(meth)acrylate, propylene glycol mono(meth)acrylate and diethylene glycol mono(meth)acrylate.

5. A resin composition consisting of a polyoxyalkylene polyol phosphate ester having a hydroxyl value of 10–780 mg KOH/g and one or more polymerizable or reactive functional group-containing compounds being capable of reacting. with the phosphate ester and/or with a metal salt derived from said phosphate ester to give a cured coating, wherein the molar ratio of said one or more polymerizable or reactive functional group-containing compounds to said polyoxyalkylene polyol phosphate ester is in the range of 1:1 to 10:1.

6. A resin composition according to claim 5 wherein said one or more polymerizable or reactive functional group-containing compounds is at least one member selected form the group consisting of polyisocyanates, active hydrogen-containing (meth)acrylates, (meth)acrylic acid, maleic anhydride and glycidyl ethers.

7. A resin composition according to claim 5 wherein said metal salt is an alkali metal salt.

8. A resin composition according to claim 7 wherein said alkali metal salt is a sodium, potassium or lithium salt.

* * * * *